United States Patent
Haynes et al.

(10) Patent No.: US 10,457,406 B2
(45) Date of Patent: Oct. 29, 2019

(54) DUAL CONFIGURATION EVACUATION ASSEMBLY

(71) Applicant: GOODRICH CORPORATION, Charlotte, NC (US)

(72) Inventors: Timothy C. Haynes, Prescott Valley, AZ (US); Ryan Schmidt, Gilbert, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 371 days.

(21) Appl. No.: 15/466,473

(22) Filed: Mar. 22, 2017

(65) Prior Publication Data

US 2018/0273190 A1 Sep. 27, 2018

(51) Int. Cl.
  *B64D 25/14* (2006.01)
  *B63C 9/22* (2006.01)
  *B63B 27/14* (2006.01)

(52) U.S. Cl.
  CPC .............. *B64D 25/14* (2013.01); *B63C 9/22* (2013.01); *B63B 2027/145* (2013.01)

(58) Field of Classification Search
  CPC ........ B63C 2009/042; B63C 2009/044; B64D 25/14
  See application file for complete search history.

(56) References Cited

U.S. PATENT DOCUMENTS

| | | | |
|---|---|---|---|
| 2,804,633 A | 9/1957 | Taylor et al. | |
| 3,827,094 A * | 8/1974 | Fisher | A62B 1/20 441/38 |
| 3,833,088 A * | 9/1974 | Chacko | B64D 25/14 182/48 |
| 3,860,984 A | 1/1975 | Fisher | |
| 4,332,049 A * | 6/1982 | Fisher | A62B 1/20 169/48 |
| 4,519,782 A * | 5/1985 | Fisher | A62B 1/20 182/48 |
| 5,733,158 A | 3/1998 | Higginbotham et al. | |
| 5,921,831 A | 7/1999 | Schulze | |
| 6,536,715 B1 * | 3/2003 | Moran | B64D 25/14 182/48 |
| 9,162,735 B2 | 10/2015 | Grainger | |

FOREIGN PATENT DOCUMENTS

EP 0034371 8/1981

OTHER PUBLICATIONS

European Patent Office, European Search Report dated May 4, 2018 in Application No. 18157337.9-1010.

* cited by examiner

*Primary Examiner* — Philip J Bonzell
*Assistant Examiner* — Tye William Abell
(74) *Attorney, Agent, or Firm* — Snell & Wilmer L.L.P.

(57) ABSTRACT

An evacuation assembly of an aircraft may include an evacuation slide and a sheet coupled to the evacuation slide. The sheet may be deployable in a negative lift configuration and a canopy configuration. In the negative lift configuration, the sheet may extend across at least a portion of an underside of the evacuation slide. In the canopy configuration, the sheet may extend over at least a portion of a top side of the evacuation slide. The evacuation assembly may also include a support that is coupled to and extends between the top side of the evacuation slide and the sheet in response to the sheet being in the canopy configuration.

12 Claims, 5 Drawing Sheets

DUAL CONFIGURATION EVACUATION ASSEMBLY

FIELD

The present disclosure relates to aircraft evacuation assemblies, and more specifically to evacuation slides.

BACKGROUND

An evacuation slide assembly may include an inflatable slide that helps passengers disembark from an aircraft in the event of an emergency or other evacuation event. The slides may deploy from a door sill or a side of the aircraft fuselage. Aircraft evacuation slides may also be utilized as passenger rafts in the event of a water landing.

SUMMARY

Disclosed herein, according to various embodiments, is an evacuation assembly of an aircraft. The evacuation assembly, according to various embodiments, includes an evacuation slide and a sheet coupled to the evacuation slide, wherein the sheet is deployable in a negative lift configuration and a canopy configuration. In the negative lift configuration the sheet may extend across at least a portion of an underside of the evacuation slide and in the canopy configuration the sheet may extend over at least a portion of a top side of the evacuation slide.

In various embodiments, the evacuation assembly includes a support. The support may be coupled to and may extend between the top side of the evacuation slide and the sheet in the canopy configuration. In various embodiments, the evacuation slide includes a longitudinal axis and a first longitudinally extending border tube and a second longitudinally extending border tube that extend parallel to the longitudinal axis to form opposing lateral edges of the evacuation slide. The support may be disposed in a middle section between the first longitudinally extending border tube and the second longitudinally extending border tube. In various embodiments, the support is a first support and the evacuation slide includes a second support that is longitudinally spaced apart from the first support and that is disposed in the middle section.

In various embodiments, a first portion of the sheet is permanently coupled to the evacuation slide and a second portion of the sheet is detachably coupled to the evacuation slide. In various embodiments, the evacuation slide includes a longitudinal axis, a first longitudinally extending border tube, and a second longitudinally extending border tube. The first longitudinally extending border tube and the second longitudinally extending border tube may extend parallel to the longitudinal axis to form opposing lateral edges of the evacuation slide. The first portion of the sheet may be permanently coupled to the first longitudinally extending border tube and the second portion of the sheet may be detachably coupled to the second longitudinally extending border tube.

In various embodiments, the evacuation slide includes a head portion and a toe portion. The first portion of the sheet may be permanently coupled to at least one of the head portion and the toe portion and the second portion of the sheet may be detachably coupled to the other of the head portion and the toe portion. In various embodiments, the sheet is a first sheet having a first portion and a second portion, and the evacuation assembly may include a second sheet having a third portion and a fourth portion. The first portion and the third portion may be permanently coupled to the evacuation slide and the second portion and the fourth portion may be detachably coupled together. In various embodiments, the second portion and the fourth portion are detachably coupled to the support in the canopy configuration.

In various embodiments, in the negative lift configuration the sheet and the underside of the evacuation slide are cumulatively shaped and configured to produce negative lift in response to air flowing across the evacuation slide in a width direction, wherein the width direction is perpendicular to a longitudinal axis of the evacuation slide. In various embodiments, the evacuation slide includes a head portion and a toe portion, wherein the longitudinal axis extends centrally along a length of the evacuation slide from the head portion to the toe portion. In the negative lift configuration a top length of a top air flow path across the top side of the toe portion of the evacuation slide in the width direction may be less than a bottom length of a bottom air flow path across the sheet and the underside of the toe portion of the evacuation slide in the width direction.

Further disclosed herein, according to various embodiments, is an evacuation assembly of an aircraft. The evacuation assembly may include an evacuation slide having a longitudinal axis and a first longitudinally extending border tube and a second longitudinally extending border tube that extend parallel to the longitudinal axis to form opposing lateral edges of the evacuation slide. The evacuation assembly may further include a sheet coupled to the evacuation slide. The sheet may be deployable in a negative lift configuration and a canopy configuration. In the negative lift configuration the sheet extends across at least a portion of an underside of the evacuation slide and in the canopy configuration the sheet extends over at least a portion of a top side of the evacuation slide. The evacuation assembly may also include a support coupled to and extending between the top side of the evacuation slide and the sheet in response to the sheet being in the canopy configuration. The support may be disposed in a middle section between the first longitudinally extending border tube and the second longitudinally extending border tube.

Also disclosed herein, according to various embodiments, is method of using an evacuation assembly of an aircraft. The method may include inflating an evacuation slide such that the evacuation slide is in slide mode. In the slide mode, a sheet may be coupled to the evacuation slide in a negative lift configuration. The method may include detaching the evacuation slide from the aircraft such that the evacuation slide is in raft mode and configuring the sheet in a canopy configuration.

In various embodiments, configuring the sheet in the canopy configuration is performed in response to the evacuation slide being in the raft mode. In various embodiments, configuring the sheet in the canopy configuration is performed after detaching the evacuation slide from the aircraft. In various embodiments, in the negative lift configuration the sheet extends across at least a portion of an underside of the evacuation slide. In various embodiments, in the canopy configuration the sheet extends over at least a portion of a top side of the evacuation slide.

A first portion of the sheet may be permanently coupled to the evacuation slide and a second portion of the sheet may be detachably coupled to the evacuation slide. In various embodiments, configuring the sheet in the canopy configuration includes detaching the second portion of the sheet from the evacuation slide, retracting the sheet from the underside of the evacuation slide, extending the sheet over the portion of the top side of the evacuation slide, and, after extending the sheet over the portion of the top side of the evacuation slide, attaching the second portion of the sheet to the evacuation slide. In various embodiments, a support is coupled to the top side of the evacuation slide and is disposed in a middle section of the evacuation slide between two longitudinally extending border tubes, wherein extending the sheet over the portion of the top side of the evacuation slide includes coupling the sheet to the support.

In various embodiments, the sheet is a first sheet having a first portion and a second portion and a second sheet is coupled to the evacuation slide. The second sheet may have a third portion and a fourth portion. The first portion and the third portion may be permanently coupled to the evacuation slide and the second portion and the fourth portion may be detachably coupled together in the negative lift configuration. Configuring the sheet in the canopy configuration may include detaching the second portion from the fourth portion, retracting the first sheet and the second sheet from the underside of the evacuation slide, extending the first sheet and the second sheet over the portion of the top side of the evacuation slide, and, after extending the first sheet and the second sheet over the portion of the top side of the evacuation slide, attaching the second portion and the fourth portion to the support.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
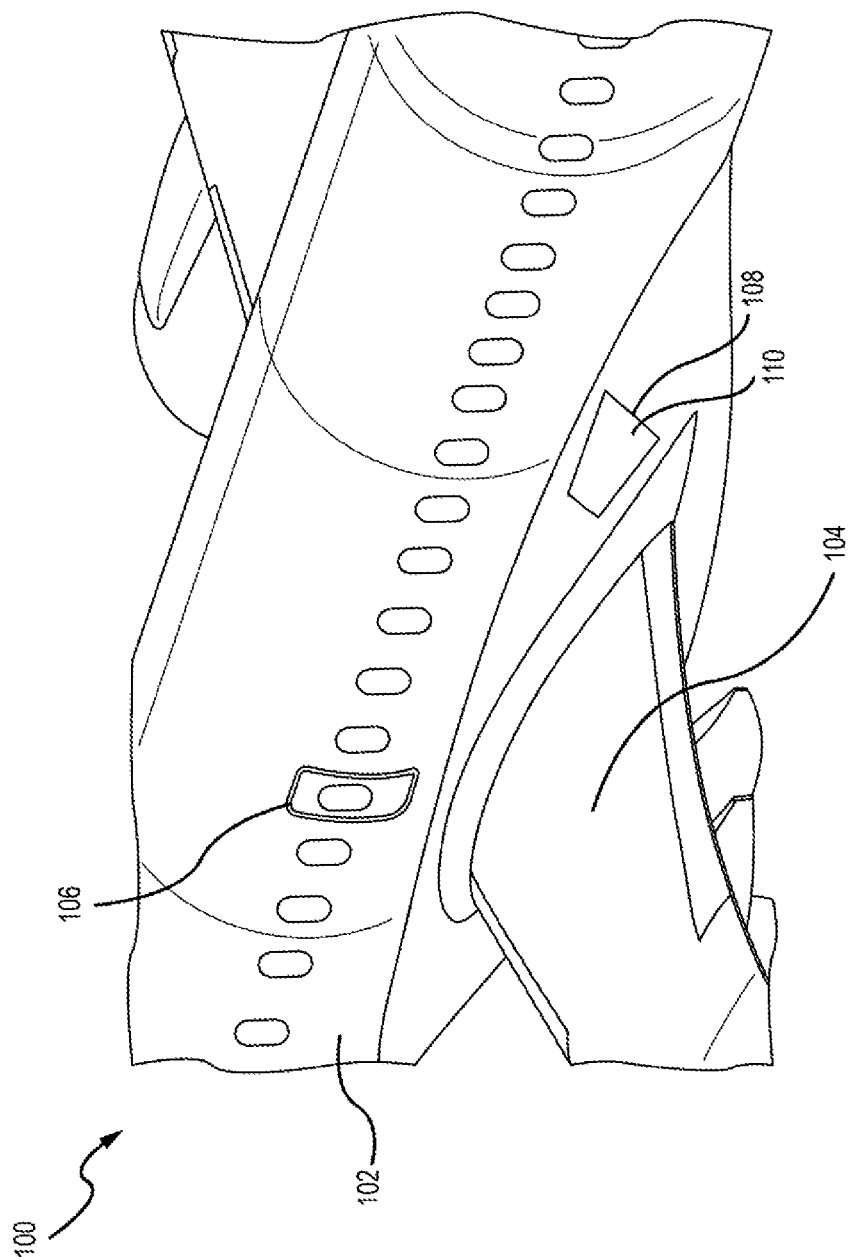
FIG. 1 illustrates a perspective view of an aircraft having an evacuation assembly, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation. Throughout the present disclosure, like reference numbers denote like elements. Accordingly, elements with like element numbering may be shown in the figures but may not be necessarily be repeated herein for the sake of clarity.

A first component that is "axially outward" of a second component means that a first component is positioned at a greater distance in either longitudinal direction away from the longitudinal center of the composite component along its longitudinal axis than the second component. A first component that is "axially inward" of a second component means that the first component is positioned closer to the longitudinal center of the composite component along its longitudinal axis than the second component.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Referring to FIG. 1, an exemplary aircraft 100 is shown, in accordance with various embodiments. Aircraft 100 may comprise a fuselage 102 with wings 104 fixed to fuselage 102. Emergency exit door 106 may be disposed on fuselage over wing 104 such that passengers exiting emergency exit door 106 would exit onto wing 104. An evacuation assembly 108 may be disposed aft of emergency exit door 106. Blowout panel 110 may cover evacuation assembly 108 when installed on the aircraft 100. In various embodiments, the evacuation assembly 108 may include and/or be housed within a packboard mounted to the aircraft 100.

The evacuation assembly 108 may jettison the blowout panel 110 and deploy an evacuation slide, such as an inflatable evacuation slide, in response to emergency exit door 106 opening or in response to another evacuation event. A common inopportune occurrence associated with conventional evacuation slides is that when such slides are deployed in high lateral wind conditions, the wind may cause the slide to "kite" such that the toe end of the slide does not touch the ground, rendering the slide less usable. If the slide lifts off the ground above the airplane's door sill height after full extension, the slide may even block the aircraft exit and prevent safe evacuation of passengers and crew.

In the event of an emergency water landing, aircraft evacuation slides can also be used as passenger rafts. To protect passengers from the sun, rain, and/or other weather conditions while situated in the evacuation slide in raft mode, conventional evacuation assemblies have traditionally included a standalone canopy system that can be assembled, installed, and mounted to the evacuation slide after the evacuation slide is in raft mode.

Disclosed herein, according to various embodiments, is an evacuation assembly that can be arranged in two different configurations based on whether an evacuation slide of the evacuation assembly is in slide mode or in raft mode. Said differently, the evacuation assembly disclosed herein includes a sheet that is coupled to the evacuation slide that can be utilized in a negative lift configuration to reduce or eliminate the "kiting" effect described above when the evacuation slide is in slide mode and that can also be utilized in a canopy configuration to protect passengers when the evacuation slide is in raft mode, in accordance with various embodiments.

Figure 2:
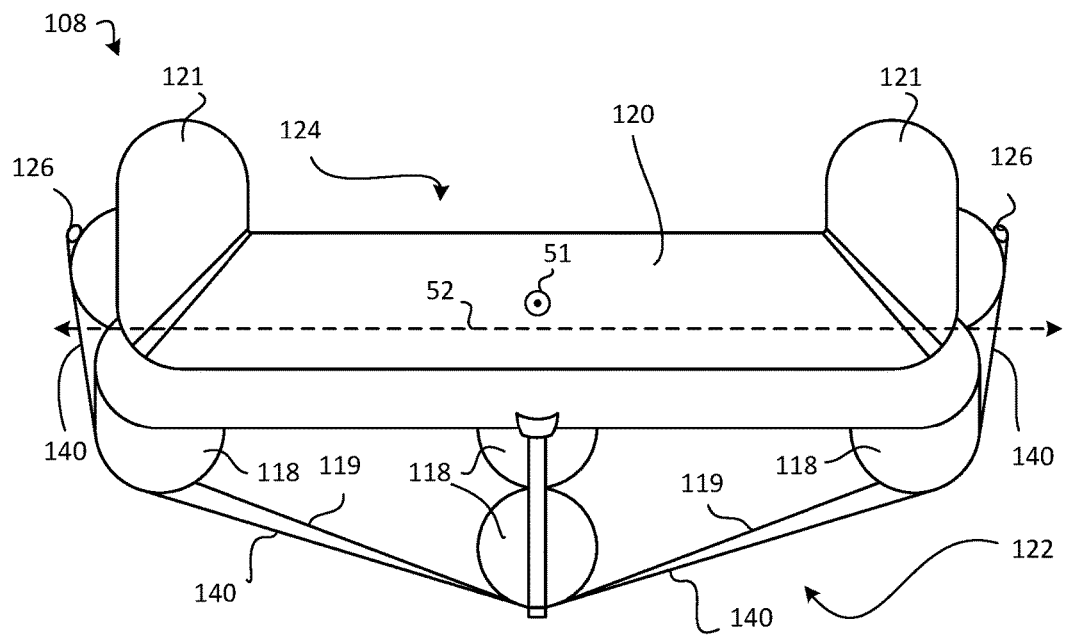
FIG. 2 illustrates a cross-sectional view of an evacuation assembly with a sheet in a negative lift configuration, in accordance with various embodiments.

In various embodiments, and with reference to FIG. 2, the evacuation assembly 108 includes an evacuation slide 120 and a sheet 140 coupled to the evacuation slide 120. The sheet 140 is deployable in a negative lift configuration, with reference to FIG. 2, and a canopy configuration, with reference to FIG. 3. In the negative lift configuration (FIG. 2), the sheet 140 extends across at least a portion of an underside 122 of the evacuation slide 120, according to various embodiments. As described in greater detail below, the sheet 140 disposed on the underside 122 of the evacuation slide 120 at least partially imparts an inverted airfoil shape to the evacuation assembly, thereby creating negative lift that helps to hold the toe end of the evacuation slide 120 against the ground or against the water when the evacuation slide 120 is in slide mode. In the canopy configuration (FIG. 3), the sheet 140 extends over at least a portion of a top side 124 of the evacuation slide 120, according to various embodiments. Also, as described in greater detail below, with the sheet 140 disposed over the top side 124 of the evacuation slide 120, passengers situated in the evacuation slide 120 in the raft mode are protected by the sheet 140 from sun, precipitation, and/or other weather conditions. The sheet 140 may be made from a fabric material, a plastic material, or a composite material, among others. For example, the sheet 140 may be made from the same material as the evacuation slide 120 (e.g., nylon or nylon coated with a thermoplastic material, among others).

In various embodiments, the configuration of the evacuation assembly 108 can be switched by a single person. For example, the evacuation slide 120 may inflate/deploy with the sheet 140 attached to the evacuation slide 120 in the negative lift configuration. After the aircraft 100 has been evacuated, the evacuation slide 120 can be detached from the aircraft 100, as described in greater detail below with reference to FIG. 6, and the evacuation slide 120 can be converted to raft mode. In various embodiments, a single passenger can reconfigure the sheet 140 so that it no longer extends across the underside 122 of the evacuation slide 120 but instead extends over the top side 124 of the evacuation slide. Before describing the details pertaining to how the evacuation assembly 108 can be switched between the two configurations, it may be beneficial to first describe the features and structure of the two configurations.

In the negative lift configuration, and with reference to FIG. 2, the sheet 140 extends across and below at least a portion of the underside 122 of the evacuation slide 120, according to various embodiments. Said differently, the sheet 140 may extend below various support tubes 118 and/or various support straps 119 to impart a convex shape to the underside 122 of the evacuation slide 120. In various embodiments, the sheet 140 contributes to the convex shape of the underside 122 of the evacuation slide 120 such that the underside 122 of the evacuation slide generally curves about a longitudinal axis 51 of the evacuation slide. The longitudinal axis 51 may extend substantially centrally along a length of the evacuation slide 120 from a head portion attached to the aircraft 100 to a toe portion that contacts the ground/water.

Accordingly, in various embodiments, a top length of a top air flow path across the top side 124 of at least the toe portion of the evacuation slide 120 in a width direction 52 is less than a bottom length of a bottom air flow path across the underside 122 (i.e., the sheet 140) of at least the toe portion of the evacuation slide 120 in the width direction 52.

In other words, and according to various embodiments, the top flow path of wind across the top surface of the evacuation slide 120 in a width direction 52, which is generally perpendicular to the longitudinal axis 51 of the evacuation slide 120, is shorter than the bottom flow path of wind across the bottom surface. Accordingly, the velocity of the wind flowing across the top side 124 is less than the velocity of the wind flowing across the underside 122 of the evacuation slide, and such a velocity difference creates a pressure differential, per Bernoulli's principle, that produces a downward force on the evacuation slide. Thus, the convex shape imparted by the sheet 140 at least partially contributes to an inverted airfoil-like shape/geometry of the evacuation slide 120 that creates negative lift in windy conditions, thereby mitigating the "kiting" effect described above.

In various embodiments, the sheet 140 extends across the entire width of the underside 122 of the evacuation slide 120. In various embodiments, however, the sheet may not extend across an entire width of the underside 122 of the evacuation slide, but may only extend across portions of the underside 122 of the evacuation slide while still contributing to the convex, inverted airfoil shape. In various embodiments, the sheet 140 extends substantially along the entire longitudinal length of the evacuation slide 120. In various embodiments, the sheet may not extend along the entire longitudinal length of the evacuation slide 120, but may only be disposed along a portion (e.g., the toe portion).

Figure 3:
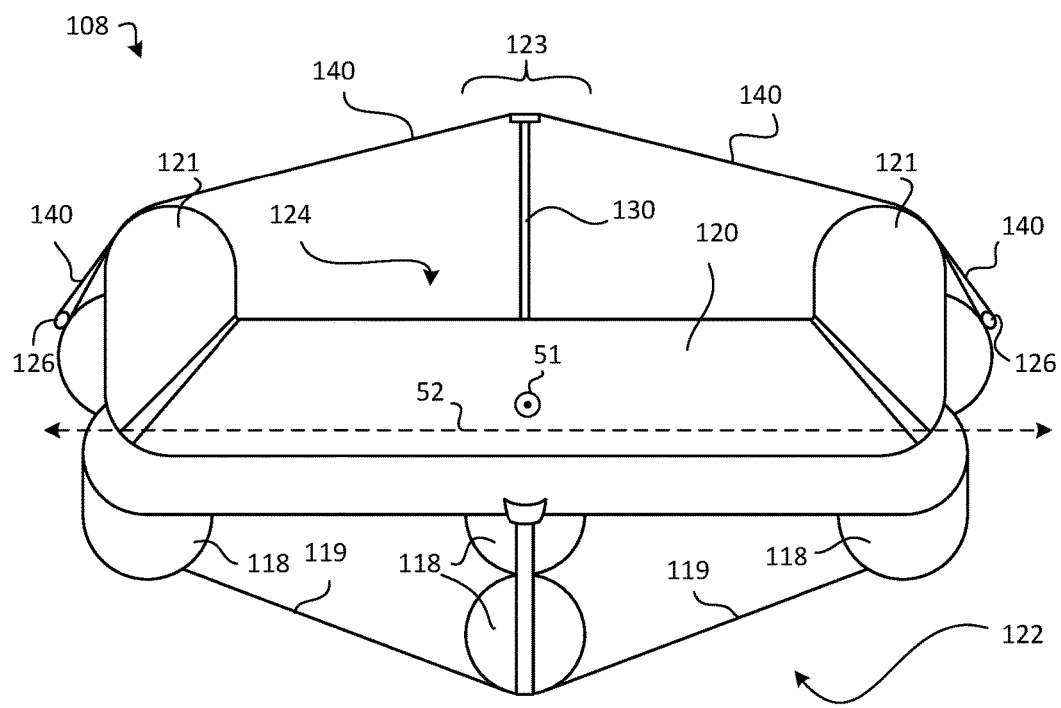
FIG. 3 illustrates a cross-sectional view of an evacuation assembly with a sheet in a canopy configuration, in accordance with various embodiments.

In the canopy configuration, and with reference to FIG. 3, the sheet 140 extends across and over the top side 124 of the evacuation slide 120, according to various embodiments. The evacuation assembly 108 may further include one or more supports 130 that are coupled to and extend between the top side 124 of the evacuation slide 120 and the sheet 140 in the canopy configuration. In various embodiments, the support 130 may include a pole, a tube, a divider, or other suitable device/structure. The support 130 may engage the sheet 140 to hold the sheet 140 a distance apart from the top side 124 of the evacuation slide 120. In various embodiments, as described in greater detail below, the sheet 140 may be directly coupled/attached to the support 130.

In various embodiments, the evacuation slide 120 includes two longitudinally extending border tubes 121 that extend parallel to the longitudinal axis 51 to form opposing lateral edges of the evacuation slide 120. The support 130 may be disposed in a middle section 123 between the longitudinally extending border tubes 121. In various embodiments, a plurality of supports may extend along the longitudinal length of the evacuation slide 120 in the middle section 123. For example, a first support and a second support may be disposed in the middle section 123 but may be longitudinally spaced apart from each other. In various embodiments, the support 130 is a continuous structure that extends substantially along the entire longitudinal length of the evacuation slide.

In various embodiments, the support 130 is permanently coupled to the evacuation slide 120. In various embodiments, however, the support 130 may be detachably coupled to the evacuation slide 120, thereby allowing a passenger/crew member to attach/detach the support 130 depending on which configuration (e.g., the negative lift configuration with the slide in slide mode or the canopy configuration with the slide in raft mode).

In various embodiments, and with reference to FIGS. 2 and 3, the sheet 140 may be detachably coupled to the evacuation slide 120 at various connection points 126. For example, the sheet 140 may be detachably tethered, tied, anchored, connected, fastened, or otherwise coupled to the evacuation slide 120 via the various connection points 126. In various embodiments, the sheet 140 may utilize the same connection points 126 regardless of the sheet's configuration. However, in various embodiments, the evacuation assembly 208 may include connection points 126 for the negative lift configuration that are different (e.g., either located in different locations along the evacuation slide 120 or that have a different connection mechanism) than the connection points 126 for the canopy configuration. In various embodiments, the sheet and/or connection point 126 may include a ratcheting mechanism to enable a passenger/crew member to adjust the tension in the sheet 140.

Figure 4:
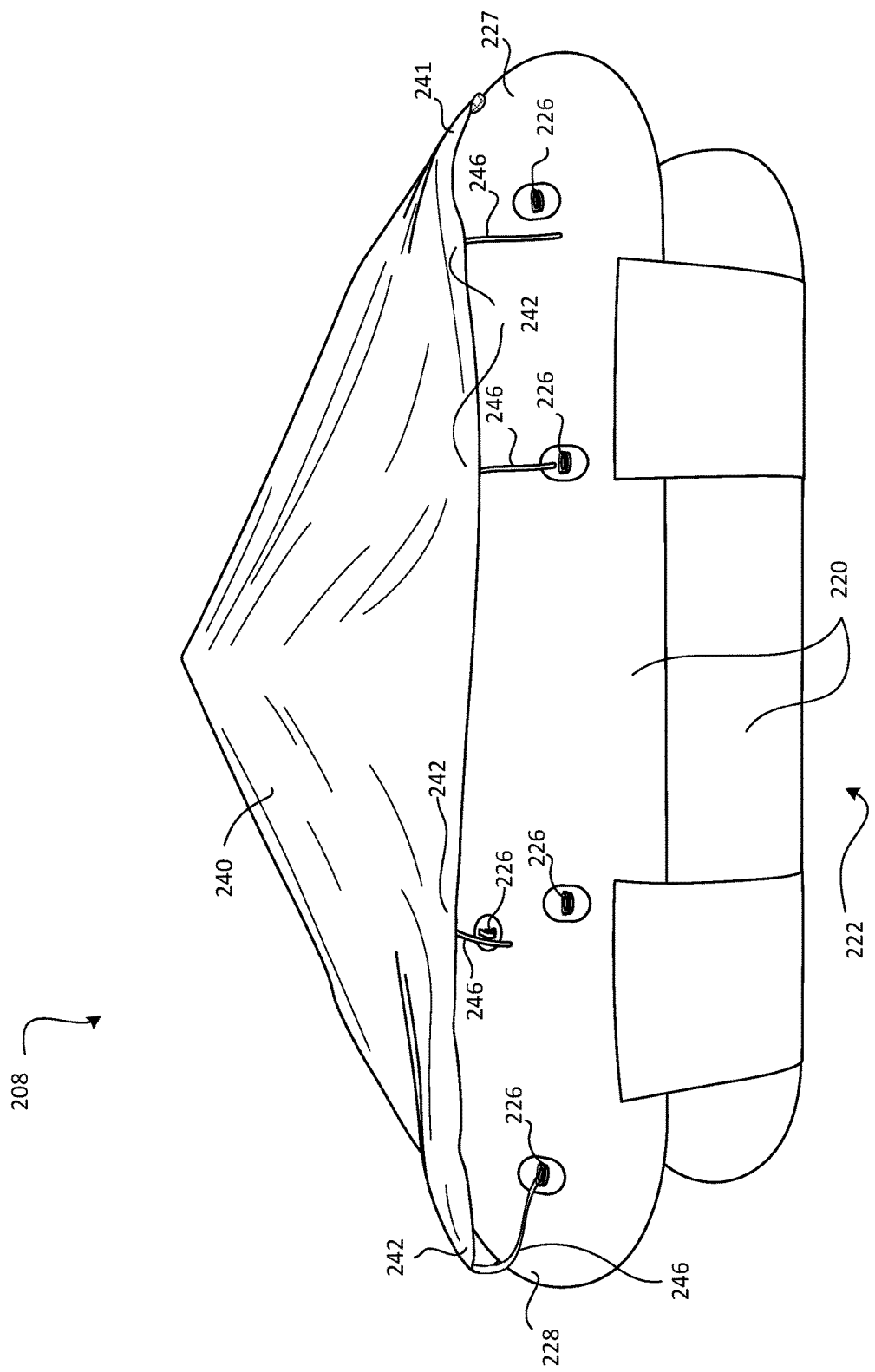
FIG. 4 illustrates a perspective view of an evacuation assembly with a sheet in a canopy configuration, in accordance with various embodiments.

In various embodiments, and with reference to FIG. 4, the evacuation assembly 208 includes a sheet 240 extend over the top side of the evacuation slide 220 in the canopy configuration. The sheet 240 may include a first portion 241 that is permanently coupled to the evacuation slide 220 (via bonding, permanent adhesive, etc.) and a second portion 242 that is detachably coupled to the evacuation slide 220. In various embodiments, the second portion 242 of the sheet 240 may include straps 246 or other attachment fixtures that are engageable/connectable with corresponding anchor points 226 of the evacuation slide 220. In various embodiments, for example, the first portion 241 of the sheet 240 may be permanently coupled to a first lateral portion/edge 227 (e.g., a first longitudinally extending border tube) of the evacuation slide 220 and the second portion 242 may be detachably coupled to a second lateral portion/edge 228 (e.g., a second longitudinally extending border tube) of the evacuation slide 220. As shown in FIG. 4, the sheet 240 may also be detachably coupled along a toe portion/edge of the evacuation slide 220 as well.

As described in greater detail below with reference to FIG. 6, with the first portion 241 of the sheet 240 permanently coupled to the evacuation slide 220 and the second portion 242 of the sheet 240 detachably coupled to the evacuation slide 220, a passenger/crew member can detach the second portion 242 from the evacuation slide 220 and reconfigure the sheet 240 to be in the desired configuration. For example, before configuring the sheet 240 in the canopy configuration depicted in FIG. 4, the first portion 241 of the sheet 240 may have been folded the opposite direction at the first edge 227 of the evacuation slide 220 such that the sheet 240 extended across the underside 222 of the evacuation slide 220 in response to the evacuation slide 220 being in slide mode. Thus, switching between configurations may include detaching the second portion 242 of the sheet 240, retracting the sheet from a first side (e.g., the underside 222 of the evacuation slide 220), extending the sheet 240 over a second side (e.g., the top side of the evacuation slide 220), and attaching the second portion 242 of the sheet 240 to the evacuation slide 220.

Figure 5:
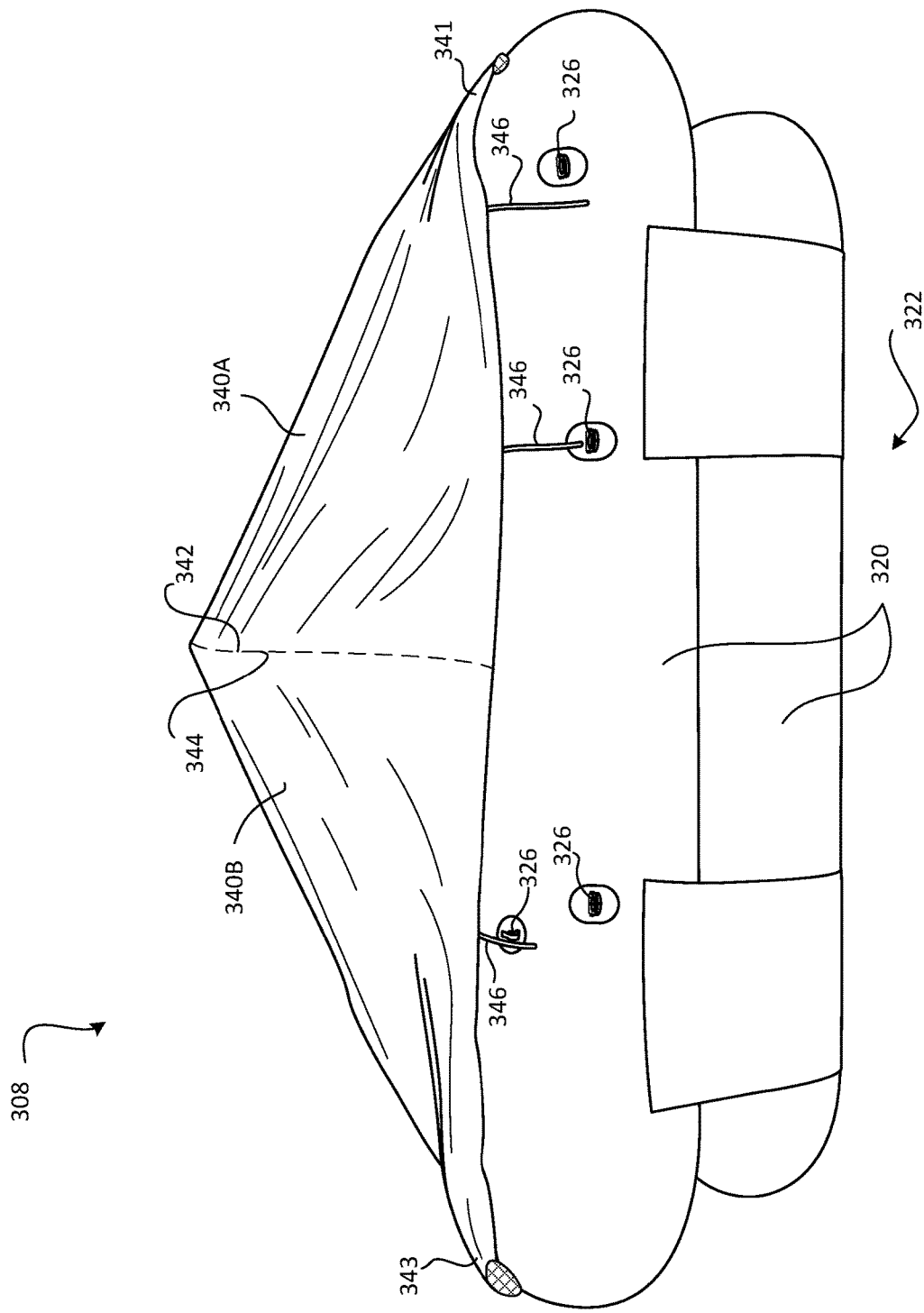
FIG. 5 illustrates a perspective view of an evacuation assembly with a sheet in a canopy configuration, in accordance with various embodiments.

In various embodiments, and with reference to FIG. 5, the sheet 340 may include two sections. Said differently, the evacuation assembly 308 may include a first sheet 340A and a second sheet 340B. The first sheet 340A may include a first portion 341 and a second portion 342 and the second sheet 340B may include a third portion 343 and a fourth portion 344. The first portion 341 of the first sheet 340A and the third portion 343 of the second sheet 340B may be permanently coupled to the evacuation slide 320 (e.g., along opposing lateral edges). In various embodiments, the second portion 342 of the first sheet 340A and the fourth portion 344 of the second sheet 340B may be detachably coupled together (e.g., using hook and loop type fasteners, etc.).

The sheets 340A, 340B of the evacuation assembly 308 may further include various straps 346 or other attachment fixtures that are engageable/connectable with corresponding anchor points 326 of the evacuation slide 320. While FIG. 5 depicts the second portion 342 and the fourth portion 344 detachably coupled together in the canopy configuration, the second portion 342 and the fourth portion 344 may be similarly attached together on the underside 322 of the evacuation slide 320 in the negative lift configuration. In the canopy configuration, and according to various embodiments, the second portion 342 of the first sheet 340A and the fourth portion 344 of the second sheet 340B may be detachably coupled directly to the support 130 (with momentary reference to FIG. 3).

Figure 6:
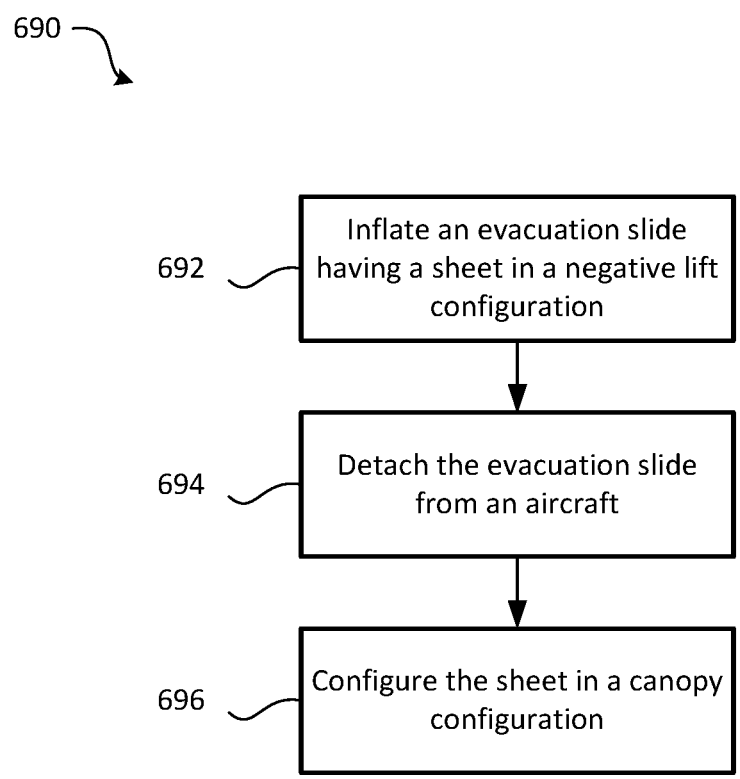
FIG. 6 is a schematic flow chart diagram of a method of using an evacuation assembly of an aircraft, in accordance with various embodiments.

In various embodiments, and with reference to FIG. 6, a method 690 of using an evacuation assembly of an aircraft is provided herein. The method 690 includes, according to various embodiments, inflating an evacuation slide having a sheet in the negative lift configuration at step 692. That is, the evacuation slide may be inflated so as to be in slide mode to facilitate evacuation of passengers/crew. The method 690 further includes, according to various embodiments, detaching the evacuation slide from the aircraft at step 694. By detaching the evacuation slide from the aircraft, the evacuation slide may be in raft mode. The method 690 further includes, according to various embodiments, configuring the sheet in the canopy configuration at step 696. In various embodiments, step 696 may be performed in response to the evacuation slide being in raft mode (e.g., step 696 may be performed after step 694).

As mentioned above, configuring the sheet in the canopy configuration (step 696) may include detaching a detachable portion of the sheet from the evacuation slide, retracting the sheet form the underside of the evacuation slide, extending sheet over at least a portion of the top side of the evacuation slide, and attaching the detachable portion to the evacuation slide.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation assembly of an aircraft, the evacuation assembly comprising:
   an evacuation slide; and
   a sheet coupled to the evacuation slide, wherein the sheet is deployable in a negative lift configuration and a canopy configuration;
   wherein:
      in the negative lift configuration the sheet extends across at least a portion of an underside of the evacuation slide;
      in the canopy configuration the sheet extends over at least a portion of a top side of the evacuation slide;
      the evacuation slide comprises a longitudinal axis, a first longitudinally extending border tube, and a second longitudinally extending border tube;
      the first longitudinally extending border tube and the second longitudinally extending border tube extend parallel to the longitudinal axis to form opposing lateral edges of the evacuation slide;
      a first portion of the sheet is affixed to the first longitudinally extending border tube; and
      a second portion of the sheet, at least in the canopy configuration, is detachably coupled to the second longitudinally extending border tube.

2. The evacuation assembly of claim 1, wherein the sheet does not extend across an entire width of an underside of the evacuation slide, such that the second portion of the sheet is detachably coupled to a first connection point of the evacuation slide in the negative lift configuration and the second portion of the sheet is detachably coupled to a second connection point of the evacuation slide in the canopy configuration, wherein the first connection point and second connection point are at different locations.

3. The evacuation assembly of claim 1, wherein the first portion of the sheet is permanently bonded to the first longitudinally extending border tube.

4. The evacuation assembly of claim 1, wherein in the negative lift configuration the sheet and the underside of the evacuation slide are cumulatively shaped and configured to produce negative lift in response to air flowing across the evacuation slide in a width direction, wherein the width direction is perpendicular to a longitudinal axis of the evacuation slide.

5. The evacuation assembly of claim 4, wherein the evacuation slide comprises a head portion and a toe portion, wherein the longitudinal axis extends centrally along a length of the evacuation slide from the head portion to the toe portion, wherein in the negative lift configuration a top length of a top air flow path across the top side of the toe portion of the evacuation slide in the width direction is less than a bottom length of a bottom air flow path across the sheet and the underside of the toe portion of the evacuation slide in the width direction.

6. The evacuation assembly of claim 2, wherein:
   the evacuation assembly comprises a support; and
   the support is coupled to and extends between the top side of the evacuation slide and the sheet in the canopy configuration.

7. The evacuation assembly of claim 6, wherein
   the support is disposed in a middle section between the first longitudinally extending border tube and the second longitudinally extending border tube.

8. The evacuation assembly of claim 7, wherein:
   the support is a first support; and
   the evacuation slide comprises a second support that is longitudinally spaced apart from the first support and that is disposed in the middle section.

9. An evacuation assembly of an aircraft, the evacuation assembly comprising:
   an evacuation slide comprising a longitudinal axis and a first longitudinally extending border tube and a second longitudinally extending border tube that extend parallel to the longitudinal axis to form opposing lateral edges of the evacuation slide;
   a sheet coupled to the evacuation slide, wherein:
      the sheet is deployable in a negative lift configuration and a canopy configuration;
      in the negative lift configuration the sheet extends across at least a portion of an underside of the evacuation slide;
      in the canopy configuration the sheet extends over at least a portion of a top side of the evacuation slide;
      a first portion of the sheet is affixed to the first longitudinally extending border tube; and a second portion of the sheet, at least in the canopy configuration, is detachably coupled to the second longitudinally extending border tube; and a support coupled to and extending between the top side of the evacuation slide and the sheet in response to the sheet being in the canopy configuration, wherein the support is disposed in a middle section between the first longitudinally extending border tube and the second longitudinally extending border tube.

10. A method of using an evacuation assembly of an aircraft, the method comprising:

inflating an evacuation slide such that the evacuation slide is in slide mode, wherein in the slide mode a sheet is coupled to the evacuation slide in a negative lift configuration, wherein in the negative lift configuration the sheet extends across at least a portion of an underside of the evacuation slide, wherein the evacuation slide comprises a longitudinal axis and a first longitudinally extending border tube and a second longitudinally extending border tube that extend parallel to the longitudinal axis to form opposing lateral edges of the evacuation slide;

detaching the evacuation slide from the aircraft such that the evacuation slide is in raft mode; and after detaching the evacuation slide from the aircraft, configuring the sheet in a canopy configuration, wherein in the canopy configuration the sheet extends over at least a portion of a top side of the evacuation slide, wherein a first portion of the sheet is affixed to the first longitudinally extending border tube of the evacuation slide and a second portion of the sheet is detachably coupled to the evacuation slide, wherein configuring the sheet in the canopy configuration comprises:

detaching the second portion of the sheet from the evacuation slide;

retracting the sheet from the underside of the evacuation slide;

extending the sheet over the portion of the top side of the evacuation slide; and after extending the sheet over the portion of the top side of the evacuation slide, attaching the second portion of the sheet to the second longitudinally extending border tube of the evacuation slide.

11. The method of claim 10, wherein configuring the sheet in the canopy configuration is performed in response to the evacuation slide being in the raft mode.

12. The method of claim 10, wherein a support is coupled to the top side of the evacuation slide and is disposed in a middle section of the evacuation slide between the first and second longitudinally extending border tubes, wherein extending the sheet over the portion of the top side of the evacuation slide comprises coupling the sheet to the support.

* * * * *